3,541,019
METHOD OF PREPARING A ZINC SILICATE PHOSPHOR

Rimantas Glemza and Gordon James Turner, Baltimore, Md., assignors to W. R. Grace & Co., New York, N.Y., a corporation of Connecticut
No Drawing. Filed Mar. 15, 1968, Ser. No. 713,314
Int. Cl. C09k 1/54
U.S. Cl. 252—301.6                    5 Claims

ABSTRACT OF THE DISCLOSURE

A process for preparing a manganese doped zinc orthosilicate phosphor by slurrying a silica hydrogel with solutions of soluble salts of zinc and manganese to form an intimate mixture of the components. The salts are precipitated inside and outside the hydrogel structure and the slurry is fed into a high temperature fluid energy mill to effect dewatering and decomposition of the zinc and manganese salts. The milled product is then fired at temperatures about 1600° F. to prepare a phosphor having a green fluorescence.

---

This invention relates to fluorescent materials, generally called phosphors, which are rendered luminescent by impinging radiation, such as ultraviolet rays, X-rays, cathode rays, etc. In particular, the invention relates to a cheap, large scale method of preparing fine size manganese doped zinc orthosilicate, which is particularly useful in fluorescent lamps, cathode ray tubes, various display devices, on postage stamps, etc.

The calcined materials are in a state of fine subdivisions and have surface areas from 1 to 10 m.$^2$/g. This property of small particle size is of particular utility where the phosphor is applied to a surface as an ink or paste, yielding a more homogeneous layer than would be obtained by using coarser materials.

Zinc orthosilicate doped with small quantities of divalent manganese and having willemite structure is known to exhibit fluorescence in the green part of the visible spectrum.

In the prior art methods of preparing these materials, solutions of zinc and manganese salts are precipitated with a soluble silicate, the precipitate washed, dried, ground, and fired at temperatures above 900° C. to form the correct phase. Alternatively, the salts of zinc and manganese are mixed dry, or with a liquid or solid flux, with silica. The mixture is ground, ball milled, and then fired.

Our novel process is advantageous in that it eliminates the washing or grinding step, prior to calcination, to prepare the phosphor.

Broadly speaking, our process comprises slurrying solutions of salts, of zinc and manganese with silica hydrogel. The divalent zinc and manganese ions diffuse readily into the silica during the slurrying step and form a very intimate mixture of the components. The zinc and manganese salts are then precipitated as hydroxides, carbonates, oxalates, etc. using a material which will yield a salt that is readily decomposable into gaseous components. The slurry or solids resulting from the above procedures are fed into a high temperature fluid energy mill. The milled product is then fired at temperatures above 1600° F.

The first step of our process is the selection of the source of silicon. A particularly convenient form of silica is silica hydrogel which is commercially available in large quantities and in a pure form. The water content of this silica can range from 10 to 90% by weight with 30 to 40% being typical. The hydrogel is prepared commercially by the gelling of sodium silicate solution with a strong mineral acid such as sulfuric acid, for example. It is critically important that the silica source have a structure of this type so that ionic species can be dispersed intimately between the silica fibrils in the hydrogel.

In the next step, zinc and manganese components are added. This addition is conveniently carried out by using solutions of zinc and manganese salts that are decomposable into oxides. Examples of suitable salts include carbonates, nitrates, sulfates, and salts of carboxylic acids, such as the formates, acetates, oxylates, etc. Alternatively, such compounds of zinc and manganese are mixed dry with the silica hydrogel. The said hydrogel is crushed to below 8 mesh and slurried with a solution containing zinc and manganese nitrate, for example. During the slurrying step, the $Zn^{++}$ and $Mn^{++}$ ions diffuse readily into the solid hydrogel structure, forming a very intimate mixture of components. The zinc and manganese salts can then be precipitated as hydroxides, carbonates, oxalates, etc., using $NH_4OH$ or the appropriate $NH_4^+$ salt, or any other compound, such as $N_2H_5OH$, which will yield a salt readily decomposable into gaseous components. The precipitate is formed inside and outside of the hydrogel structure, thus maintaining the intimacy of components. The precipitated slurry can be filtered, although we have found that this is not necessary in our process. If filtration is not done, as is usually the case, the coprecipitation of zinc and manganese does not have to be quantitative.

The manganese is used as a promoter and is present in approximately 0.001 gram mole to about 0.05 gram mole with respect to 1 gram mole of zinc. In one particular solution, for example, 2350 grams of $Zn(NO_3)_2 \cdot 6H_2O$ and 35 grams of $Mn(NO_3)_2$ were made up into a solution which was mixed with the hydrogel.

The following variation in our process yields the same results. Compounds of Zn and Mn decomposable into corresponding oxides are mixed dry with silica hydrogel. When the compounds are soluble, such mixing results in a reaction. Mixtures of solid $Zn(NO_3)_2 \cdot 6H_2O$ with said hydrogel result in liquid and solid phases. If the salt is dehydrated beforehand, the mixture solidifies into a hard substance upon standing. When the compound is insoluble, such as ZnO, mixing is straight forward. In order to facilitate the incorporation of $Zn^{++}$ and $Mn^{++}$ ions into the hydrogel structure, silica hydrogel is acidified by slurrying with an acid and air dried. Combination of the oxide or hydroxide results in an exothermic reaction which does not affect subsequent handling of the mixture.

In the next step of our process, the slurry of solids resulting from the above mixtures are fed into a fluid energy mill operated at temperatures from 600° F. to 1500° F.

The fluid energy mill is a standard article of commerce and is modified to operate at temperatures high enough to effect the necessary decomposition and dehydration of the salts to prepare the phosphor. The feed materials may be either in the form of a solution, a slurry, or a solid mixture. The slurries or solids are fed directly into the fluid energy mill. In operating an 8 inch, high temperature, fluid energy mill, for example, it is convenient to feed the slurry at a rate of about 5 to 300 ml. per minute preferably 120 to 220 ml. per minute. The solids can be fed at the rate of 50 to 330 grams per minute, preferably about 100 to 200 grams per minute.

In this step, the following operations take place:
  (a) Dewatering in the case of slurries,
  (b) Dehydration of the hydrogel into the fine sized silica,
  (c) Partial decomposition of the zinc and manganese salts or hydroxides, and
  (d) Complete decomposition of by-product salts, such as ammonium nitrate, for example.

All of these operations take place without sintering of the small particles or loss of homogeneity of the small particles. The milled particles contain 10 to 30% water and zinc and manganese as oxides, hydroxides, or other decomposable salts. All components exist as an extremely intimate and homogeneous mixture and are very finely divided.

In the last step of our process, the milled material is fired to prepare the manganese doped zinc orthosilicate, having a willemite structure. When the milled materials are fired at or above 1600° F. for about 1 to 5 hours, a manganese doped zinc orthosilicate which exhibits bright green fluorescence under a 2537 A. light is recovered. Improved fluorescence can be obtained by firing to temperatures of about 1900 to 2100° F. under an inert atmosphere, such as argon, nitrogen, etc.

The most efficient light output was obtained when the phosphor was prepared using the precipitation route. In a typical case, the light emission was found to peak at 525 millimicrons with a peak half-width of 37 millimicrons.

The calcined particles are in a state of fine subdivision and have surface areas of from 1 to 10 square meters per gram. The small size of the particles having these properties has particular utility where the phosphor is applied to a surface as an ink or paste, yielding a more homogeneous layer than would be obtained if coarser materials were used.

Our invention is illustrated by the following specific, but non-limiting examples.

EXAMPLE I

A slurry was prepared by mixing 2350 grams of zinc nitrate hexahydrate $Zn(NO_3)_2 \cdot 6H_2O$, 35 grams of a 51% solution of manganese nitrate $Mn(NO_3)_2$ and 765 grams of crushed silica hydrogel, containing 31.5% $SiO_2$, with about 9 liters of water. The mixture was then stirred for 1 hour. A sufficient quantity of ammonium hydroxide (containing about 15% $NH_3$) was added to increase the pH of the slurry to 8.5. The wet precipitate was allowed to dry in air for several days and then crushed to below 8 mesh. The solids were fed into a high temperature fluid energy mill at the rate of 150 grams per minute and milled with steam at a temperature of 840° C. The milled product contained 13.4% water and only 0.5% ammonium nitrate $NH_4NO_3$. The only crystalline phase observed was ZnO. After calcination at 1650° F. for 5 hours, the product was $Zn_2SiO_4$ and luminesced green under UV light. The final composition of the product was $Zn_{1.98}Mn_{0.02}SiO_4$.

EXAMPLE II

A quantity, 1260 grams of silica hydogel that had been acidified with 35% nitric acid, and contained 24.8% solids, was mixed with 806 grams of zinc oxide. The acidified silica gel contained a small amount of manganese nitrate $Mn(NO_3)_2$. The solids were transferred to a fluid energy mill and milled with steam at a rate of 150 grams per minute at a temperature of 830° F. The milled product contained 5.3% water and 0.5% nitric acid. As in Example I, the only crystalline phase observed was zinc oxide. The milled product was calcined at 1650° F. for 5 hours in air. A zinc silicate $Zn_2SiO_4$ product was recovered that luminesced under ultraviolet light. The composition of the final product was $Zn_{1.97}Mn_{00.3}SiO_4$.

EXAMPLE III

A total of 2270 grams of technical grade zinc carbonate ($ZnCO_3$) was treated with 133 grams of a 15.8% manganese nitrate solution by spraying the manganese nitrate solution onto a rolling bed of the zinc carbonate in a mixer. A silica hydrogel was prepared to contain 35% $SiO_2$ and 186.9 grams of this hydrogel was used in the experiment. The zinc-manganese premix was fed simultaneously with the silica hydrogel to an 8 inch, high temperature, fluid energy mill. The premix was fed at a rate of 84 grams per minute, the silica hydrogel at a rate of 66 grams per minute. The mill was operated at 1410° F. inlet temperature. The temperature in the mill was 950° F. Steady state operating conditions were maintained for a period of 30 minutes. At the end of this time the mill product was examined and found to be a low density (0.17 gram per cc.) fine powder of light tan color.

This product was calcined in a muffle furnace at 1750° F. for a period of 1 hour. The calcined powder was a white free-flowing, very fine sized powder which fluoresced with brilliant green fluorescence under ultraviolet radiation of 3660 angstroms. The X-ray diffraction pattern of the product showed it to be zinc orthosilicate ($Zn_2SiO_4$) of the willemite structure.

EXAMPLE IV

This example illustrates the milling of a slurry without any attempt to dry or dewater the slurry prior to milling.

A slurry was prepared by mixing 1760 grams of zinc nitrate hexahydrate $Zn(NO_3)_2 \cdot 6H_2O$, 26 grams of manganese nitrate solution, prepared to contain 51% $Mn(NO_3)_2$, and 574 grams of silica hydrogel containing 31.5% $SiO_2$. The composite was mixed with about 8 liters of water and stirred for several days. At the end of this time, the slurry was fed directly into a fluid energy mill with steam at a rate of 70 cc. per minute. The mill was operated at 770° F. The product recovered from the mill contained both zinc oxide and zinc hydroxide crystalline phases and contained 9% water, and 14% nitrate electrolyte. After calcination at 1650° F. for 5 hours in air, the product was zinc silicate $Zn_2SiO_4$ which luminesced green under ultraviolet light. The composition of the product was $Zn_{1.98}Mn_{0.02}SiO_4$.

EXAMPLE V

This example shows the effect of calcination at different temperatures on the properties of the phosphor product.

In this series of runs, 5 slurries of divalent zinc and divalent manganese nitrates were prepared with silica hydrogel using procedure set out in Example I. Each of the slurries had a different manganese to zinc ratio. The slurries in each case were neutralized with concentrated ammonium hydroxide to a final pH of 6 to 7. The slurries as prepared contain 5 to 6% by weight of oxides. The slurries were fed to a fluid energy mill, operated at a temperature of 800° F. at a rate of 150 cc. per minute. The products were calcined in air at a temperature of about 1600° F. In all cases, the products were fluorescent in ultraviolet light. The amount of fluorescence improved with increasing temperature up to 1950° F. and remained constant after calcination at higher temperatures. The relative light output for the samples calcined at 1950° F. is shown in the table below.

TABLE I

| Run No. | Composition | Relative light output |
| --- | --- | --- |
| 1 | $Zn_{1.95}Mn_{0.05}SiO_4$ | 1 |
| 2 | $Zn_{1.99}Mn_{0.01}SiO_4$ | 3 |
| 3 | $Zn_{1.96}Mn_{0.04}SiO_4$ | 4 |
| 4 | $Zn_{1.94}Mn_{0.06}SiO_4$ | 5 |
| 5 | $Zn_{1.92}Mn_{0.08}SiO_4$ | 5 |

In each case, the larger number indicates higher light output. Sample IV was recalcined at 1950° F. in argon. It became whiter and its fluorescence improved over the fluorescence obtained after calcination in air. The willemite structure of zinc silicate $Zn_2SiO_4$ was the only crystalline phase identified.

Obviously, many modifications and variations of the invention may be made without departing from the essence and scope thereof, and only such limitations should be applied thereto as are indicated in the appended claims.

What is claimed is:

1. A process for preparing a manganese activated zinc silicate phosphor which comprises the steps of:
   (a) mixing zinc and manganese salts decomposable into oxides and volatile components with a silica hydrogel in an amount sufficient to provide about 2 moles of zinc per mole of orthosilicate and 0.001–0.05 mole of manganese per mole of zinc in the phosphor product,
(b) decomposing and dehydrating the salt and hydrogel components in a fluid energy mill operated, in the presence of steam at a temperature above about 500° F., and
(c) firing the milled materials from the mill in an inert atmosphere at a temperature of 1900 to 2100° F. and recovering the manganese activated zinc silicate phosphor.

2. The process according to claim 1 wherein the decomposable zinc and manganese salts are selected from the group consisting of the nitrates, carbonates, sulfates and salts of carboxylic acids 3. The process according to claim 1 wherein the zinc and manganese salts are insoluble and the hydrogel is acidified prior to mixing with said salts and decomposition and dehydration in the fluid energy mill.

4. A process for preparing a manganese activated zinc silicate phosphor having the willemite structure which comprises the steps of:
(a) preparing solutions of divalent zinc and manganese salts in an amount sufficient to provide about two moles of zinc per mole of orthosilicate and 0.001–0.05 mole of manganese per mole of zinc in the phosphor product,
(b) mixing these solutions with a silica hydrogel.
(c) precipitating the zinc and manganese salts as compounds selected from the group consisting of the hydroxides, carbonates and oxalates,
(d) decomposing and dehydrating the salt and hydrogel components in a fluid energy mill operated, in the presence of steam at a temperature above about 500° F., and
(e) firing the milled material from the fluid energy mill in an inert atmosphere at a temperature of 1900 to 2100° F. and recovering the manganese activated zinc silicate phosphor.

5. The process according to claim 4 wherein the zinc and manganese salts are precipitated as the hydroxides.

References Cited
UNITED STATES PATENTS

| | | | |
|---|---|---|---|
| 2,195,341 | 3/1940 | Randall | 252—301.6 |
| 2,210,087 | 8/1940 | Leverenz | 252—301.6 |
| 2,460,546 | 2/1949 | Stephanoff | 34—57 X |
| 2,856,268 | 10/1958 | Young | 34—57 X |
| 3,208,950 | 9/1965 | Yocom et al. | 252—301.6 |
| 2,297,108 | 9/1942 | McKeag et al. | 252—301.4 X |

TOBIAS E. LEVOW, Primary Examiner

J. COOPER, Assistant Examiner